Figure 1:
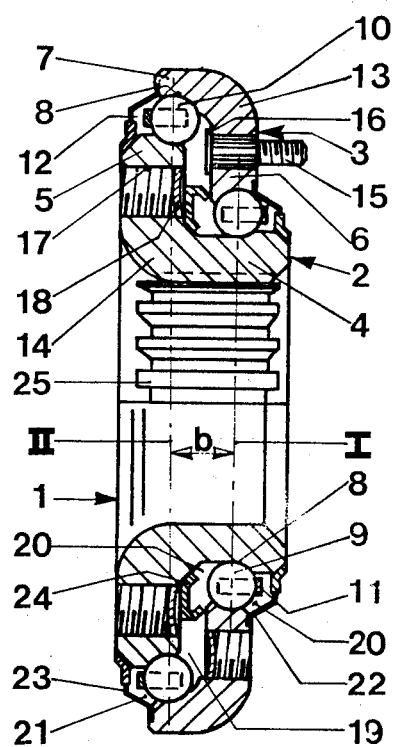

United States Patent [19]

Kapaan

[11] 3,971,604
[45] July 27, 1976

[54] BOX BEARING

[75] Inventor: Jan Hendrikus Kapaan, Ijsselstein, Netherlands

[73] Assignee: SKF Industrial Trading and Development Company, B.V., Jutphaas, Netherlands

[22] Filed: Nov. 18, 1974

[21] Appl. No.: 524,491

[30] Foreign Application Priority Data
Dec. 10, 1973 Netherlands............. 7316847

[52] U.S. Cl.................... 308/183; 308/174; 308/191; 308/189 R
[51] Int. Cl.².......... F16C 19/00; F16C 21/00; F16C 33/00
[58] Field of Search............ 308/174, 189 R, 183, 308/177, 187.1, 200, 216, 191–199, 201

[56] References Cited
UNITED STATES PATENTS

| | | | |
|---|---|---|---|
| 2,488,825 | 11/1949 | Palumbo | 308/183 |
| 3,727,999 | 4/1973 | Dunn et al. | 308/216 |
| 3,860,301 | 1/1975 | Zerbola | 308/183 |

Primary Examiner—M. H. Wood, Jr.
Assistant Examiner—Richard A. Bertsch
Attorney, Agent, or Firm—Daniel M. Rosen

[57] ABSTRACT

Rolling bearing, comprising rings with fastening flanges with two rows of rolling elements in between, each provided with a bearing cage separating the rolling elements from one another, and sealing components protecting the rolling elements against penetrating dirt and dust, characterized in that the bearing rings are essentially rectangular or L-shaped in axial cross-section and provided near both their ends with a running surface for a row of rolling elements, in such a manner that the one row of rolling elements is of larger diameter than the other row, and the fastening provisions on the flange of an inner and/or outer ring are located between these rows.

19 Claims, 4 Drawing Figures

BOX BEARING

The invention relates to a rolling bearing, comprising rings with fastening flanges, with two rows of rolling elements between the flanges, each row being provided with a bearing cage separating the rolling elements from one another, and sealing components protecting the rolling elements against penetrating dirt and dust.

A rolling bearing of this type is known, for instance, from U.S. Pat. No. 3,583,511.

The present invention introduces a rolling bearing of the described type of which in particular the scope of use has been enlarged. These advantages are achieved mainly because:

1. the bearing now can be loaded much higher than a bearing of the known type and same dimensions;
2. considerable stress concentrations in the flanges are avoided;
3. uneven loads on the bearing are evenly distributed over the rolling elements;
4. specific and hence often expensive designs of bearing cages or sealing components are no longer necessary;
5. the bearing rings are relatively simple to manufacture.

According to the invention, the above-mentioned advantages are achieved in that the bearing rings are essentially rectangular or L-shaped in axial cross section and provided near both their ends with a running surface for a row of rolling elements, in such a manner that the one row of rolling elements is of larger diameter than the other row. Fastening means on a flange of an inner and/or outer ring are located between these rows.

These arrangements have made it possible to realize a bearing of the described type, which is capable of withstanding varying loads. To this end, it is only necessary, for instance, to change the number of rolling elements of the rows thus having different diameters. The highest load capacity of the bearing is obtained if the row having the largest diameter comprises the largest possible number of rolling elements. In addition, stresses in the flanges are distributed more evenly because in between the rows of rolling elements, which are at relatively large distance from one another, there are provisions for fastening components to the flanges. Furthermore, such bearing cages and sealing components can be employed as are already being used for single-row rolling elements, which obviates the necessity of specifically designed bearing cages. Such a one-piece bearing cage is used, for instance, in rolling bearings of the present type with two rows of equal diameter, the bearing cage being capable of adapting itself to the various slightly differences in position of the rolling elements relative to one another.

A bearing is disclosed in the German Patent No. 1,129,117 provided with rows of rolling elements which are likewise placed more or less concentrically. However, the design and composition of the bearing rings are completely different, while moreover the fastening provisions on one or both rings are not located between but on either side of the rows of rolling elements.

The invention will be explained in the following by reference to the figures. Advantages and other features of the invention will become evident besides.

FIG. 1 shows part of the axial cross-section of a rolling bearing in accordance with the invention.

Figure 2:
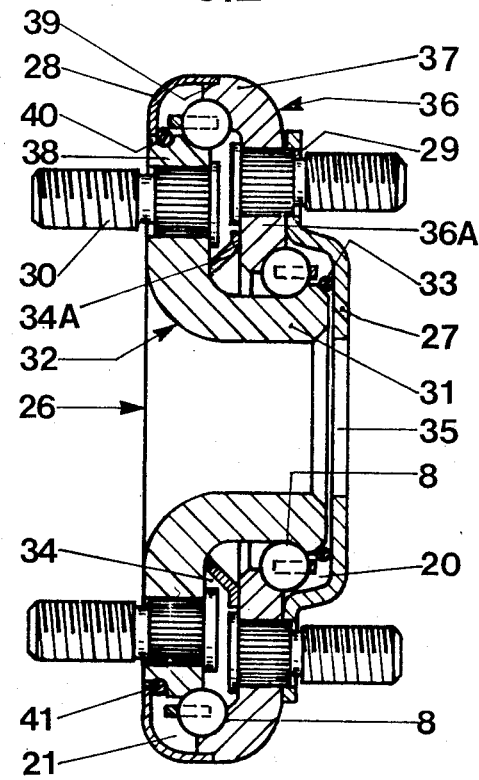

FIG. 2 likewise shows an axial cross-section of a bearing in accordance with the invention in which specific sealing components are applied.

Figure 3:
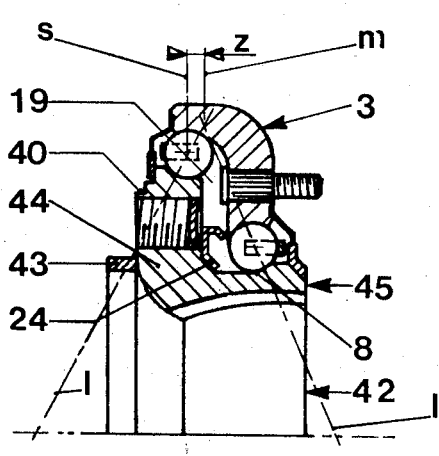

FIG. 3 shows part of a cross-section of a bearing in accordance with FIG. 1, provided with supporting and locating elements.

Figure 4:
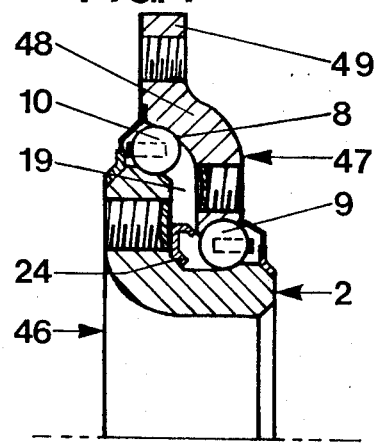

FIG. 4 likewise shows a cross-section of a part of a bearing with enlarged scope for fastening.

Referring to the view of FIG. 1, bearing 1 comprises an inner ring 2 and an outer ring 3, which rings are essentially rectangular or L-shaped. A preferred embodiment is a bearing ring made of sheet steel by forging, as sheet steel of up to 20 mm thickness can be forged into the above-mentioned shapes in a relatively simple manner using the currently available techniques. It is likewise favourable to manufacture a bearing ring 2, 3 from powdered metal, which is pressed into a mould and sintered by a conventional method. The ends 4, 5 and 6, 7 of rings 2 and 3 respectively are provided with running surfaces 8 which comprise rolling elements 9 and 10 forming rows I and II, respectively. Rolling elements 9 and 10 are separated at equal distances from one another by "snap-type" cages 11 and 12. On account of this design the diameters of rows I and I are different, in such a manner that the diameter of row II is larger than the diameter of row I, which difference, in accordance with a preferred embodiment of the invention, is larger than the diameter of a rolling element 9 or 10. Another preferred embodiment is also one in which the axial distance b between the rows I and II is equal to or slightly larger than the diameter of a rolling element 9 or 10. The described arrangement provides a bearing 1 with small radial and axial dimensions, but which capacity is considerably increased. In fact more rolling elements 10 can be placed in row II than in row I, and as a result flange parts 13 and 14 can take up higher loads (bending moments). Flange 13 furthermore comprises a bolt connection 15, which bolt head 16 abuts against flange 13 in a dust and water-tight manner. Flange 14 comprises a bolt connection of which the end of bolt hole 17 is provided with a closure 18, which likewise ensures a dust and water-tight seal of the interior 19 of bearing 1. In the described manner, rings 2 and 3 form in fact a closed box-shaped bearing 1 of which the essentially diametrically opposed slot-shaped openings 20 and 21 are closed off with curved sealing components 22 and 23. The sealing components can be of the combined metal and rubber or plastic type, depending on the provisions for fastening, the speeds of rotation, the operational conditions of the bearing, etc. Another favourable aspect is that a sealing component 24 is fitted on the inside and in the box-shaped chamber 19 of the bearing. This prevents the lubricant present in the space between sealing components 22 and 23 from being thrown out while bearing 1 is loaded, and sealing component 24 furthermore ensures that rolling elements 9 or 10 are constantly embedded in a lubricant. Inner ring 2 is also provided with coupling elements for connecting the bearing to a shaft; the latter embodiment is provided with keyed connections.

FIG. 2 shows a rolling bearing 26 which likewise comprises an essentially rectangular or L-shaped inner ring 2 and outer ring 3, in which, however, sealing components 27 and 28 are fitted against bearing rings 32, 36, which components are capable of withstanding relatively high loads. To this end, sealing component 27 is made of a light metal, plastic or sheet steel, and its shape is completely adapted to the external shape of bearing 26. In the bearing in accordance with FIG. 2, plate-shaped sealing component 27 has the shape of a dish, and its periphery is provided with openings 29 through which close-fitting bolts or rivets 30 pass. In order to obviate leakage of lubricant from the bearing and penetration of dust or dirt into it, a double-lipped sealing ring 33 is fitted between plate 27 and end portion 31 of inner ring 32. It is also possible to fit sealing ring 33 over a bevelled edge of ring 31, which obviates additional machining for an annular sealing ring. In space 34 a sealing component 34A is also fitted, which has a function identical to that of the sealing component 24 used in the bearing in accordance with FIG. 1. Furthermore, sealing plate 27 is provided with an opening 35 for a shaft to pass through. Fitting a sealing plate 27 as shown in FIG. 2 provides a simple manner of obtaining an efficient seal, which is particularly suitable for constructions in which the bearing is under external, e.g. liquid, pressure. This embodiment is particularly suitable for the bearings of agricultural machines. Seal 28, fitted on the outside of bearing 26, is clamped between rings 32 and 36. For this purpose, supporting edges 39 and 40 have been formed in end parts 37 and 38 respectively of the rings (see also FIG. 3), in such a manner that the effectively rectangular sealing ring 28 is clamped in these supporting edges. It is furthermore preferred that a sealing ring 41 is fitted in supporting edge 40, which guarantees a dust and water-tight sealing.

FIG. 3 shows a partial cross-section of a bearing 42 in accordance with the invention, this bearing being provided with locating elements 43. With the aid of these elements, attached to flange 44 of inner ring 45, components such as wheels and similar parts can be coupled to flange 44. In this embodiment, inner ring 45 is furthermore suitable for fastening to a (ball) coupling of a driving mechanism. Both locating elements 43 and supporting edges 40 can likewise be provided on outer ring 3. FIG. 3 furthermore shows the relative positions of rolling elements 9 and 10, distance z between the line of symmetry II and the line parallel to it passing through the intersection of working lines I being a measure of this relationship. The smaller the difference between the diameters of row I and row II, the larger distance z.

FIG. 4 shows an embodiment of bearing 47 in accordance with the invention in which in particular outer ring 46 has an additional provision, i.e. a second flange 49 forming a single piece with it. This arrangement provides bearing 46 with a double fastening provision (48, 49) without influencing the effect obtained, for instance, by the special placement of rows I and II with rolling elements 9 and 10. These double-flange versions can also be used with bolted and/or riveted connections.

The bearing in accordance with the invention is particularly suitable for constructions in which riveted or bolted connections between rotary parts have to be employed eliminating auxiliary connecting components, although compared with the known rolling bearing of the described type the bearing 1, 26, 42 and 46 in accordance with the invention is of better quality, while it is relatively simple to manufacture. In particular, a bearing in accordance with the invention is suitable for application in washing machines, liquid pumps, agricultural and other vehicles.

I claim:

1. A roller bearing for a rotary element comprising a pair of bearing rings having substantially L-shaped axial cross-section portions with an annular running surface adjacent each end of the L-shaped cross-sections, each L-shaped cross-section portion having a radially extending portion, said rings opposing each other to form a substantially box-shaped bearing, first and second groups of a plurality of rolling elements, said rings being arranged to define, between their respective running surfaces, first and second bearing races of first and second diameters respectively, with said first bearing race having a greater diameter than said second bearing race, said first and second groups of rolling elements being arranged in said first and second races respectively, a bearing cage for each of said groups of rolling elements, and axially extending fastening means on said radially extending portion of at least one ring between said first and second races for affixing said one ring in the axial direction to said rotary element, whereby said first and second groups of rolling elements form first and second rows respectively.

2. The roller bearing of claim 1, wherein the rolling elements are balls, and the axial distance between the centers of the balls of the two rows is at least equal to the diameter of said balls.

3. The roller bearing of claim 1, wherein the rolling elements are balls and the radial distance between the centers of the balls of the two groups is larger than the diameter of said balls.

4. The roller bearing of claim 1 comprising supporting edges in said rings at one of their adjacent edges and sealing means between said supporting edges.

5. The roller bearing of claim 1, wherein said fastening means comprises a fastening opening, comprising means for sealing said opening internally in said bearing.

6. The roller bearing of claim 1, further comprising sealing means between said rings positioned between said rows.

7. The roller bearing of claim 1, comprising a sealing plate affixed to one of said rings for sealing the space between said rings at one respective end thereof.

8. The roller bearing of claim 7, further comprising a curved annular plate mounted to seal the space between the other ends of said rings.

9. The roller bearing of claim 8, comprising sealing rings mounted to seal said sealing plate and annular plate to one of said rings.

10. The roller bearing of claim 1, comprising coupling elements on one of said rings for coupling said one ring to a shaft.

11. The roller bearing of claim 1, comprising locating elements on the outside of one of said rings.

12. The roller bearing of claim 1, wherein the number of rolling elements of said first group is at least as large as the number of rolling elements of said second group.

13. The roller bearing of claim 1, wherein one of said rings has two fastening flanges, one of which is comprised of said radially extending portion.

14. The roller bearing of claim 13, wherein said two flanges have parallel faces and form a unitary element.

15. The roller bearing of claim 1, wherein said rings are of sheet steel.

16. The roller bearing of claim 1, wherein said rings are of pressed and sintered material.

17. The roller bearing of claim 1, wherein said axially extending fastening means comprises a bolt extending axially outwardly of said roller bearing from said radially extending portion of said one ring.

18. A roller bearing comprising a first ring having a first annular running surface adjacent one outer end, a flange extending radially outwardly at the other end, and a second annular running surface at the radially outer edge of the flange, a second ring having a third inner annular running surface at one end radially outwardly of said second running surface, a flange extending radially inwardly at its other end, and a fourth annular running surface at the radially inner end of the flange radially spaced from said first running surface, a first group of bearing balls between said first and fourth running surfaces and a second group of bearing balls between said second and third running surfaces, whereby the diameter of the second group of balls is greater than the diameter of the first group of balls, bearing cage means for separating the balls of each said group, and fastening means on at least one of said flanges between the running surfaces of the respective ring.

19. A roller bearing comprising a pair of bearing rings having substantially L-shaped cross-section portions with an annular running surface adjacent each end of the L-shaped cross-sections, first and second groups of a plurality of rolling elements, said rings being arranged to define, between their respective running surfaces, first and second bearing races of first and second diameters respectively, with said first bearing race having a greater diameter than said second bearing race, said first and second groups of rolling elements being arranged in said first and second races respectively, a bearing cage for each of said groups of rolling elements, and fastening means on at least one ring between said first and second races, whereby said first and second groups of rolling elements form first and second rollers respectively, said rings opposing each other to form a substantially box-shaped bearing defining substantially diametrically opposed slot-shaped openings therebetween, with respect to their cross-sections, and further comprising curved sealing means mounted to seal said openings.

* * * * *